United States Patent [19]
Stabenow

[11] Patent Number: 5,311,961
[45] Date of Patent: May 17, 1994

[54] POWER-TAKE-OFF SAFETY SYSTEM

[76] Inventor: Eugene E. Stabenow, 11002 State Rte. 143, Marine, Ill. 62061

[21] Appl. No.: 925,973

[22] Filed: Aug. 7, 1992

[51] Int. Cl.$^5$ ............................................. B60R 21/00
[52] U.S. Cl. ................................... 180/271; 74/11; 180/53.1; 180/53.3; 198/301; 198/502.1; 340/567; 340/573
[58] Field of Search ................. 180/53.1, 53.3, 271, 180/274, 279, 53.6; 340/567, 573, 556; 198/301, 502.1; 74/11

[56] References Cited

U.S. PATENT DOCUMENTS

| | | | |
|---|---|---|---|
| 2,751,030 | 6/1956 | Null | 180/79.1 |
| 3,111,800 | 11/1963 | Quianthy | 56/25.4 |
| 3,190,061 | 6/1965 | Gilbertson | 56/25.4 |
| 3,912,924 | 10/1975 | Barrett, Jr. | 250/221 |
| 4,337,841 | 7/1982 | Law | 180/271 |
| 4,537,271 | 8/1985 | Ito et al. | 180/131 |
| 4,546,840 | 10/1985 | Yukishige et al. | 180/169 |
| 4,722,410 | 2/1988 | Melocik et al. | 180/169 |
| 4,998,093 | 3/1991 | Benoit | 340/556 |
| 5,237,883 | 8/1993 | Churchill et al. | 180/271 |

FOREIGN PATENT DOCUMENTS

| | | | |
|---|---|---|---|
| 3501598 | 7/1986 | Fed. Rep. of Germany | 340/567 |
| 43843 | 2/1988 | Japan | 340/438 |

*Primary Examiner*—Mitchell J. Hill
*Attorney, Agent, or Firm*—Armstrong, Teasdale, Schlafly & Davis

[57] ABSTRACT

A safety system for automatically shutting off the power-take-off of a tractor in an emergency to thereby stop the machine being driven by the power-take-off. The system includes at least one machine sensor for detecting the presence of a foreign body adjacent a portion of the machine, and a shut-off, responsive to the sensor, for shutting off the power-take-off when the sensor detects the presence of a foreign body adjacent the machine. Sensors can also be provided to monitor the power-take-off shaft. The sensors are preferably a photocell. The system optionally include an alarm that sounds when the sensor detects the presence of a foreign body adjacent the machine.

16 Claims, 2 Drawing Sheets

POWER-TAKE-OFF SAFETY SYSTEM

BACKGROUND AND SUMMARY OF THE INVENTION

This invention relates to a safety system for power-take-off, and in particular to a safety device that automatically shuts off the power-take-off in an emergency.

Tractors are usually provided with a power-take-off so that the power of the tractor can be used to drive various pieces of machinery, for example augers and grinders. The machine is connected to the power-take-off of the tractor with a power-take-off shaft. The controls for the power-take-off are all on the tractor, and should an emergency arise, often the only way to turn off the machine is by turning off the power-take-off on the tractor. However, the tractor controls are often left unattended while the implement is being used, particularly on a small farm. There have been several reported instances where the operator has become entangled with the machine or the power-take-off shaft, and sustained serious injuries because he or she could not reach the controls to turn off the power-take-off. These injuries have been compounded by the delay in assistance, because it was not readily apparent to passers-by that anything was amiss.

The safety system of the present invention is adapted for use with a machine that is being driven by the power-take-off of a tractor. Generally, the system comprises at least one sensor for detecting the presence of a foreign body adjacent the machine and/or the power-take-off shaft. A shut-off, responsive to the sensor, automatically shuts off the power-take-off when the sensor detects the presence of a foreign body. The system may optionally be provided with an alarm that is activated when the power-take-off is shut off, to summon assistance. Thus, when a person, animal, or object approaches selected portions of the machine and/or the power-take-off shaft, the sensors detect its presence, and the power-take-off is shut off. The sensors are preferably positioned to shut off the power-take-off before any serious injury has occurred. The sensors must be positioned, however, to allow proper functioning of the machine without unnecessary interference.

The safety system is of simple and relatively inexpensive construction. The system can be easily retrofit to existing tractors and machines, as well as be provided on new equipment. The sensors can be positioned about the machine and the tractor so as not to interfere with the normal operation of the equipment, and are preferably only activated when the power-take-off is being used. The sensors preferably anticipate potential injuries by detecting the presence of foreign objects where they should not be, and shutting off the power-take-off, to prevent the machine from causing injury to persons or animals, and damage to property. An automatic alarm can be provided to promptly summon help, in the event the operator is unable to do so, or is not present.

These and other features and advantages will be in part apparent, and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENT

Figure 1:
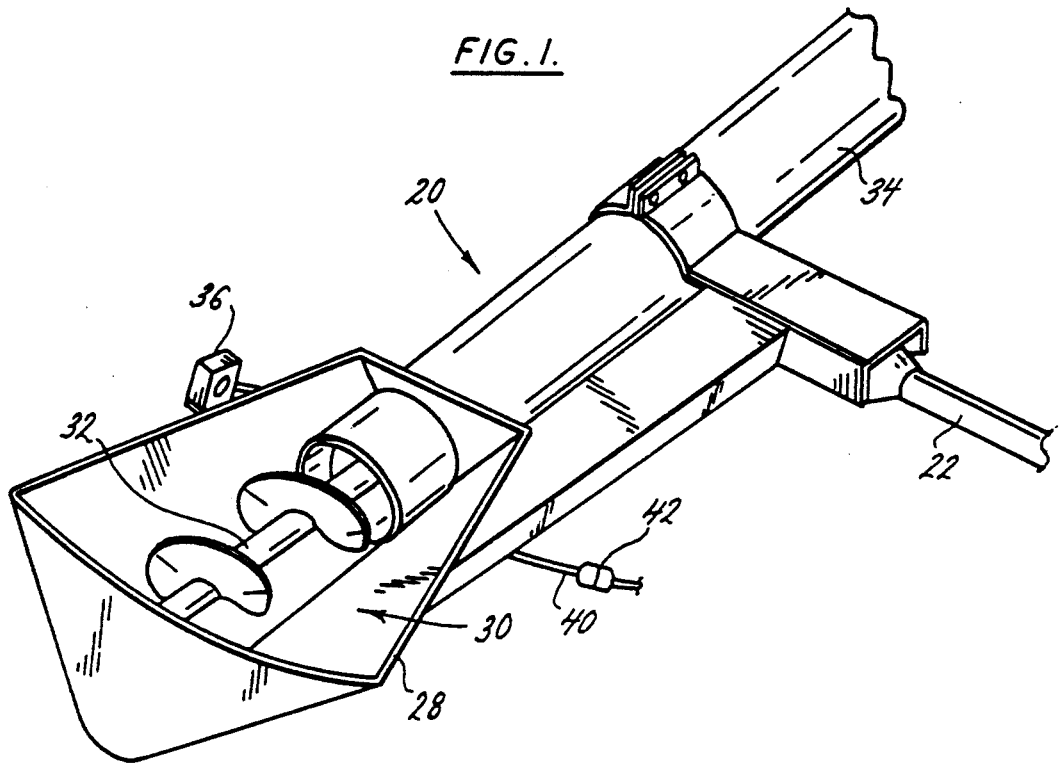
FIG. 1 is a partial perspective view of an auger, shown as it would be connected to the power-take-off of a tractor, incorporating a safety system constructed according to the principles of this invention.
Figure 3:
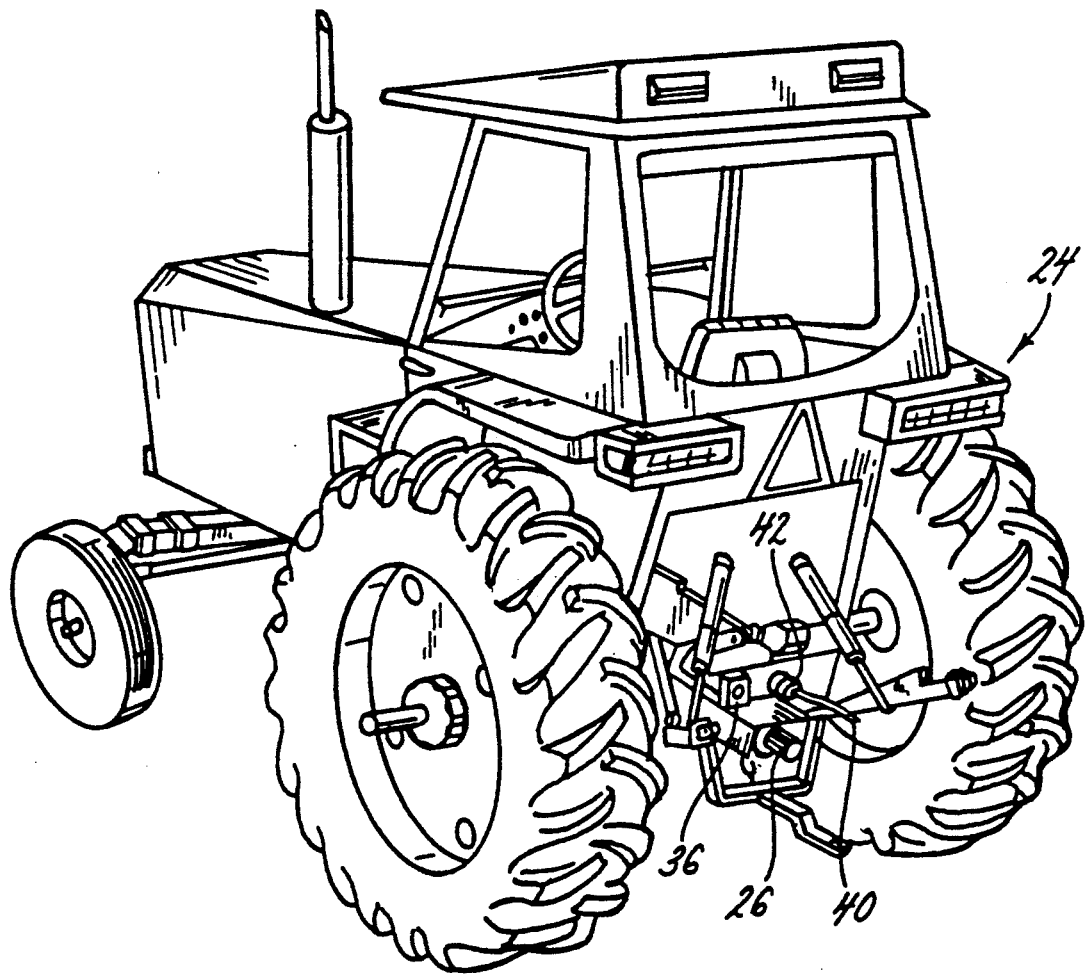
FIG. 3 is a perspective view of the tractor, showing the mounting of a detectors adjacent the power-take-off.

An auger 20, is shown in FIG. 1 as it would be connected by a power-take-off shaft 22 to the power-take-off of a tractor. A tractor 24 with a power take off 26 is shown in FIG. 3. As is well known, the auger 20 has a hopper 28 with an open mouth 30 through which grain is poured. A rotating screw 32, accessible through the open mouth 30, carries the grain through the auger tube 34. However, if someone reaches down into the mouth 30, for example a child who is unaware of the danger, or even an adult who absent mindedly reaches for something he or she dropped, that person can be entangled in the screw 32, and very seriously injured. Once entangled, that person would be unable to reach the tractor controls to shut off the power-take-off. Although this preferred embodiment is described with respect to an auger, the invention is not so limited, but applies to any type of machinery that is driven by the power-take-off 26 of a tractor 24, including for example grinders. Moreover, in addition to the hazard of the machinery, the rotating power-take-off shaft 22 provides another hazard. This high speed rotating shaft can quickly snag loose clothing, again entangling the wearer, and possibly causing very severe injuries.

According to the principles of this invention, one or more sensors 36 are mounted on the machine, e.g., auger 20, in position to detect the presence of a person, animal, or foreign object. The sensors are selected and placed so that they will not detect the normal operation of the machine, for example the loading of grain into the hopper 28 of the auger 20, but do detect the presence of persons, animals, and objects where they should not be. The sensors are preferably optical sensors, or infra red sensors, or any other type of proximity sensors, or even a mechanical switch or detectors, such a tensioned strings surrounding the critical areas of the machine. One example of a sensor suitable for this application is a type 42RLP Photoelectric Proximity Control available from the Allen-Bradley Co.

Additional sensors 36 may be mounted on the machine, e.g. auger 20, or on the tractor 24, adjacent to the power-take-off 26 to monitor the rotating power-take-off shaft 22. See, for example, FIG. 3.

Figure 2:
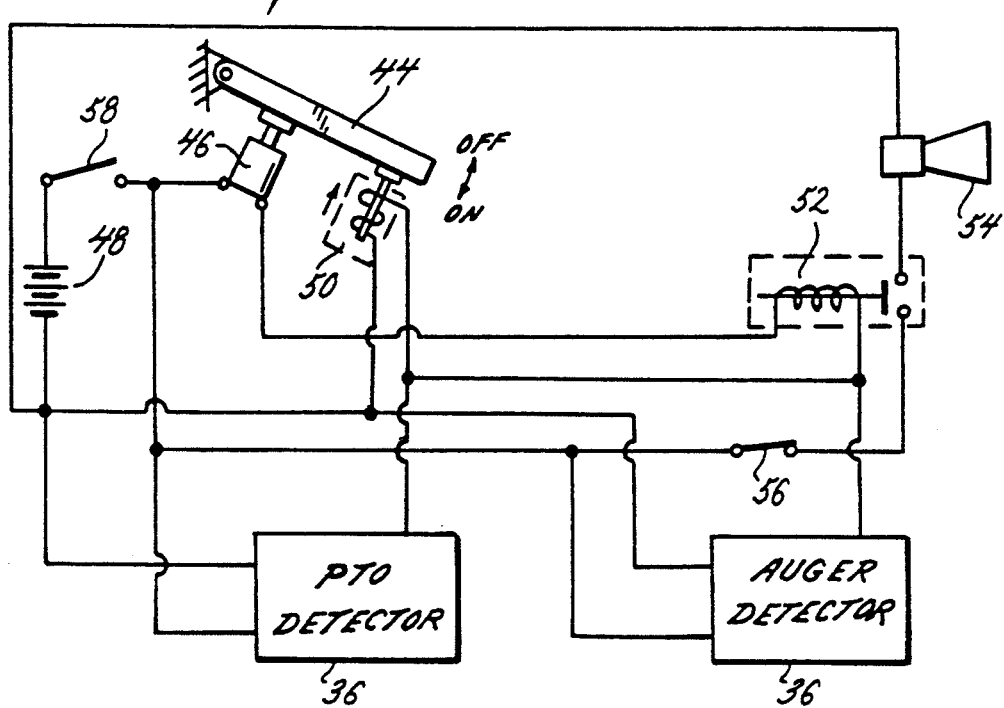
FIG. 2 is a schematic diagram of a safety system constructed according to the principles of this invention.

As shown in FIG. 2, the sensors 36 are part of an overall system 38. The sensors 36 can been connected with the system 38 with a power cord 40. Quick connect connectors 42 can be provided to quickly and easily connect the sensors 36 with the system 38. When the power-take-off control lever 44 on the tractor 24 is operated, it closes a microswitch 46, which powers the sensors 36 by connecting them with the battery 48 of the tractor 24, or otherwise to the tractor's electrical system. Alternatively, the system could be run on external current, however, since external current is not always available, and can be difficult to hook up even when available, it is preferable to run the system from the tractor's electrical system. Thereafter, should one of the sensors 36 detect the presence of a foreign object, power is diverted to solenoid 50 which mechanically operates the lever 44 to the off position. This also powers relay 52, which in turn powers a horn 54 or other alarm. The relay has a built in time delay so that the horn 54 or other alarm only sounds for a pre-determined period of time.

A first switch 56 is provided to turn off the horn 54, before the end of the pre-determined period of time, should it not be required. A second switch 58 is provided to disconnect the safety system entirely, for example if the machine will be intentionally used in such a way that the sensors will be continuously tripped.

OPERATION

When a piece of equipment, for example auger 20 is going to be used, the cord 40 from the sensor 36 on the auger is connected via connectors 42 to the safety system. The power-take-off shaft 22 is then connected between the auger 20 and the power-take-off 26 on the tractor 24. The sensors 36 on the tractor 24 are preferably permanently connected to the safety system. The safety system is automatically activated when the lever 44 is operated to turn on the power-take-off 26. The microswitch 46 closes, providing power to the sensors 36. When one of the sensors 36 is tripped, power is provided to the solenoid 48, which moves the lever 44 and turns off the power-take-off 26. Thus, the machine is stopped, hopefully before anyone or anything has become accidentally entangled in the machine or injured. The tripping of the sensors 36 also powers the horn 54, which sounds for a predetermined time to attract help. If everything is alright, the operator can turn off the horn 54 by operating switch 56.

Thus, the safety system of the present invention anticipates the potential for injury or property damage, and shuts off the power-take-off accordingly. The device is easily retrofit to existing equipment, and is extremely simple to operate, being activated automatically when the power-take-off 26 is turned on. The system not only protects against injuries from the machine but from the power-take-off shaft as well.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limited sense.

What is claimed is:

1. In combination with a tractor having a power-take-off and a machine being driven by the power-take-off, a safety system for automatically shutting off the power-take-off in an emergency to thereby stop the machine, the safety system comprising:

at least one machine sensor for detecting the presence of a foreign body adjacent a portion of the machine;

shut-off means, responsive to the sensor, for shutting off the power-take-off when the sensor detects the presence of a foreign body adjacent the machine.

2. The combination according to claim 1 wherein the sensor is a photocell.

3. The combination according to claim 1 wherein the safety system further comprises an alarm that sounds when the sensor detects the presence of a foreign body adjacent the machine.

4. The combination according to claim 1 wherein the safety system further comprises at least one power-take-off sensor for detecting the presence of a foreign body adjacent the power-take-off, and wherein the shut-off means is also responsive to the power-take-off sensor, and shuts off the power-take-off when the power-take-off sensor detects the presence of a foreign body adjacent the power-take-off.

5. In combination with a tractor having a power-take-off that can be turned on and shut off by a control on the tractor, and a machine being driven by the power-take-off, a safety system for shutting off the power-take-off in an emergency to thereby stop the machine, the safety system comprising:

at least one machine sensor for detecting the presence of a foreign body adjacent a portion of the machine;

shut-off means, responsive to the machine sensor, for operating the control on the tractor to shut off the power-take-off when the sensor detects the presence of a foreign body adjacent the machine.

6. The combination according to claim 5 wherein the control is operable between an on position in which the power-take-off is on and an off position in which the power-take-off is off, and wherein the shut-off means responsive to the sensor for operating the control comprises a plunger on the tractor for effecting movement of the control from the on to the off position.

7. The combination according to claim 5 wherein the safety system further comprises a switch for activating the machine sensor when the power-take-off is on.

8. The combination according to claim 7 wherein the control is operable between an on position in which the power-take off is on and an off position in which the power-take-off is off, and wherein the switch is positioned on the tractor such that it activates the machine sensor when the control is in the on position.

9. The combination according to claim 5 wherein the safety device further comprises an alarm that sounds after the machine sensor detects the presence of a foreign body adjacent the machine.

10. The combination according to claim 5 wherein the machine sensors are located on the machine.

11. The combination according to claim 5 further comprising at least one power-take-off sensor for detecting the presence of a foreign body adjacent the power-take-off, and wherein the shut off means is responsive to the power-take-off sensor to operate the control to shut off the power-take-off.

12. The combination according to claim 5 wherein the power-take-off sensors are located on the tractor.

13. In combination with a tractor having a power-take-off that can be turned on and shut off by a control on the tractor which is operable between an on position in which the power-takeoff is on and an off position in which the power-take-off is off, and a machine being driven by the power-take-off, a safety system for shutting off the power-take-off in an emergency to thereby stop the machine, the safety system comprising:

at least one machine sensor mounted on the machine for detecting the presence of a foreign body adjacent a portion of the machine;

shut-off means, responsive to the machine sensor, for operating the control on the tractor to the off position to shut off the power-take-off when the machine sensor detects the presence of a foreign body adjacent the machine.

14. The combination according to claim 13 wherein the safety system further comprises a switch for activating the machine sensor when the control is in the on position.

15. The combination according to claim 13 wherein the safety device further comprises an alarm that sounds after the machine sensor detects the presence of a foreign body adjacent the machine.

16. The combination according to claim 13 further comprising at least one power-take-off sensor on the tractor for detecting the presence of a foreign body adjacent the power-take-off, and wherein the shut off means is responsive to the power-take-off sensor to operate the control to the off position to shut off the power-take-off.

* * * * *